United States Patent
Schlake et al.

(10) Patent No.: US 12,298,751 B2
(45) Date of Patent: May 13, 2025

(54) MODULARIZED MODEL PREDICTIVE CONTROL FOR INDUSTRIAL PLANTS

(71) Applicant: ABB Schweiz AG, Baden (CH)

(72) Inventors: Jan Christoph Schlake, Darmstadt (DE); Mario Hoernicke, Landau (DE); Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 486 days.

(21) Appl. No.: 17/382,387

(22) Filed: Jul. 22, 2021

(65) Prior Publication Data

US 2021/0349453 A1 Nov. 11, 2021

Related U.S. Application Data

(63) Continuation of application No. PCT/EP2020/051040, filed on Jan. 16, 2020.

(30) Foreign Application Priority Data

Jan. 24, 2019 (EP) .................................... 19153605

(51) Int. Cl.
*G05B 19/418* (2006.01)
*G05B 13/04* (2006.01)

(52) U.S. Cl.
CPC ..... *G05B 19/41885* (2013.01); *G05B 13/048* (2013.01); *G05B 2219/31229* (2013.01)

(58) Field of Classification Search
USPC .......................................................... 700/29
See application file for complete search history.

(56) References Cited

U.S. PATENT DOCUMENTS

| 10,082,772 B2 | 9/2018 | Gupta |
| 2005/0055257 A1* | 3/2005 | Senturk .............. G06Q 30/0201 705/7.11 |

(Continued)

FOREIGN PATENT DOCUMENTS

| CN | 1745347 A | 3/2006 |
| CN | 101743522 A | 6/2010 |

(Continued)

OTHER PUBLICATIONS

"MPC for Upstream Oil & Gas Fields a practical view" Thesis, Doctor of Philosophy, University of Sheffield, 2017, 241 Pgs., by Al-Naumani (Year: 2017).*

Bagwell et al., "Model-Predictive Control in Practice" Encyclopedia of Systems and Control 2014, 6 Pgs (Year: 2014).*

(Continued)

*Primary Examiner* — Emilio J Saavedra
(74) *Attorney, Agent, or Firm* — Leydig, Voit & Mayer, Ltd.

(57) ABSTRACT

A method for generating a dynamic model of an industrial plant having: a plurality of physical processes that are dependent such that an outcome of at least one first process is fed into at least one second process; a plurality of low-level controllers, each controller acting upon at least one physical process such that at least one process variable of the at least one physical process is controlled to match a set-point of the low-level controller; and a plurality of sensors, each sensor measuring at least one process variable of one of the physical processes, and/or of the plant as a whole, the set-points of the low-level controllers and current values of the process variables measured by the sensors being the inputs of the model, and predicted future values of the process variables that are likely to result from applying the set-points to the low-level controllers being the outputs.

15 Claims, 4 Drawing Sheets

(56) References Cited

U.S. PATENT DOCUMENTS

| | | | |
|---|---|---|---|
| 2005/0075738 A1* | 4/2005 | Attarwala | G05B 13/048 |
| | | | 700/28 |
| 2009/0006293 A1* | 1/2009 | Grose | G06Q 10/06 |
| | | | 706/20 |
| 2009/0276061 A1 | 11/2009 | Sheth et al. | |
| 2011/0106277 A1 | 5/2011 | Sayyar-Rodsari et al. | |
| 2014/0136455 A1 | 5/2014 | Cheng | |
| 2016/0167724 A1 | 6/2016 | Kilibarda | |
| 2020/0166914 A1* | 5/2020 | Lutz | G05B 19/4188 |
| 2021/0118067 A1* | 4/2021 | Muenz | G05B 15/02 |

FOREIGN PATENT DOCUMENTS

| | | |
|---|---|---|
| CN | 102016731 A | 4/2011 |
| CN | 106170913 A | 11/2016 |
| CN | 107831736 A | 3/2018 |

OTHER PUBLICATIONS

Bedenbender et al., "Industrie 4.0 Plug-and-Produce for Adaptable Factories: Example Use Case Definition, Models, and Implementation" Federal Ministry for Economic Affairs and Energy, Jun. 2017, 69 pages (Year: 2017).*

Aswin N. Venkat, et al., "A Framework for Integrating Model Predictive Controllers to Control Large-Scale Systems", Future Directions in Systems and Control AIChE Annual Meeting, Oct. 31, 2021, pp. 1-44, AIChE, Minneapolis, USA, XP55676734.

R.R. Negenborn, et al., "Distributed Model Predictive Control: An Overview and Roadmap of Future Research Opportunities" IEEE Control Systems, Aug. 1, 2014, pp. 87-97, vol. 34, No. 4, IEEE, USA, XP011553980.

Wang et al., "From Internal Optimization to Global Collaboration: Research on the Strategies of Building Modular Production Networks," *Science and Technology Management Research*, 1: 5 pp. (Jan. 2017).

\* cited by examiner

MODULARIZED MODEL PREDICTIVE CONTROL FOR INDUSTRIAL PLANTS

CROSS-REFERENCE TO PRIOR APPLICATION

This application is a continuation of International Patent Application No. PCT/EP2020/051040, filed on Jan. 16, 2020, which claims priority to European Patent Application No. EP 19153605.1, filed on Jan. 24, 2019. The entire disclosure of both applications is hereby incorporated by reference herein.

FIELD

The invention relates to the field of automated control of physical processes in industrial plants.

BACKGROUND

In many complex industrial plants, the end result of a production process or other industrial process is obtained by a sequence of individual physical processes that are dependent in the sense that the outcome of at least one first process is fed into at least one second process. Automated control of many such plants is organized in a hierarchy that comprises at least two levels. There are low-level controllers that act upon individual physical processes, such that at least one process variable ideally matches a set-point of the low-level controller. To determine the set-points for the low-level controllers, a model predictive controller (sometimes also denoted as advanced predictive controller) is used. Starting from a current state of the process, such a controller determines, based on a (usually) time-discrete dynamic model of the plant, to which future state the current state of the industrial process as a whole will evolve if certain sets of set-points are applied to the low-level controllers. These future states are evaluated according to one or more optimality criteria (for example low energy consumption, throughout maximization), and it is usually also evaluated whether the future states meet certain constraints of the industrial process or of the plant (for example, maximal temperatures of certain sub processes). A set of set-points that, within the limits set by the constraints, results in the best future state according to the optimality criteria is calculated and applied to the low-level controllers. In the next discrete time step, this procedure is repeated, with the then-current state of the industrial process as determined from actual measurement values of state variables of the industrial process. An exemplary embodiment of such a control scheme is disclosed in U.S. Pat. No. 10,082,772 B2.

SUMMARY

In an embodiment, the present invention provides a method for generating a dynamic model of an industrial plant having: a plurality of physical processes that are dependent such that an outcome of at least one first process is fed into at least one second process; a plurality of low-level controllers, each controller acting upon at least one physical process such that at least one process variable of the at least one physical process is controlled to match a set-point of the low-level controller; and a plurality of sensors, each sensor being configured to measure at least one process variable of one of the physical processes, and/or of the plant as a whole, the set-points of the low-level controllers and current values of the process variables measured by the sensors being the inputs of the model, and predicted future values of the process variables that are likely to result from applying the set-points to the low-level controllers being the outputs of the model, the method comprising: obtaining a division of a representation of the plant into a plurality of sub-units, an input-output behavior of each sub-unit being characterized by respective subsets of the set-points, subsets of the current values of process variables, and subsets of the future predicted values of process variables; obtaining a dynamic sub-model for each sub-unit, inputs of the sub-model comprising the subset of set-points and the subset of current values of process variables, and outputs of the sub-model comprising the subset of future predicted values of process variables; obtaining, from a layout of the plant, and/or from an existing composition of the plant from physical process modules, dependencies between the sub-units; and combining the sub-models into the model of the plant according to the dependencies.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
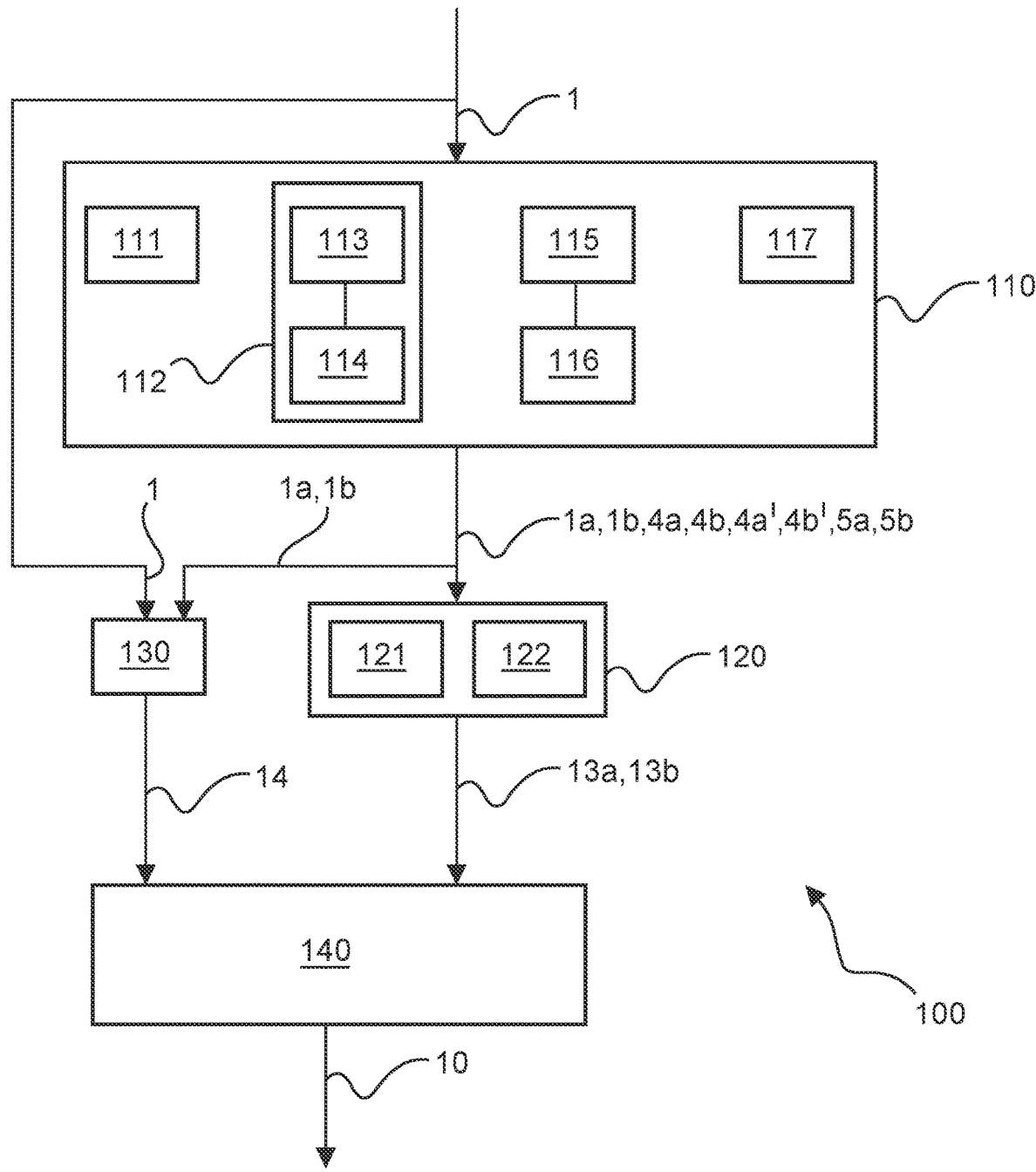
FIG. 1: Exemplary embodiment of the method 100.

In an embodiment, the present invention facilitates the obtaining of the dynamic model that is needed for the prediction of future states in the model predictive controller.

In an embodiment, the present invention provides a method for generating a dynamic model as described herein and a dynamic model as described herein. In an embodiment, the present invention provides a method for operating an industrial plant. The methods and the model may be embodied in a computer program, a storage medium and/or a download product, a computer, and/or a control system.

The inventors have developed a method for generating a dynamic model of an industrial plant. The model may, for example, be a time-discrete model. If the model as such is not time-discrete, it may be discretized at run-time of the plant.

The plant comprises a plurality of physical processes that are dependent in the sense that the outcome of at least one first process is fed into at least one second process. For example, there may be a first vessel in which a mixture of two substances is stirred at a certain speed and heated to a certain temperature, and then the mixture is passed on to another vessel where a third substance is added with a certain mass flow and the mixture is irradiated with a certain intensity of UV light in order to polymerize it. Throughout the present disclosure, the term "physical" is to be understood as a generic term that expressly also includes chemical processes where educts are converted into products by chemical reactions, and biological processes where the help of living organisms is enlisted to perform such conversions.

The plant comprises a plurality of low-level controllers. Each such controller acts upon at least one physical process such that at least one process variable of this process is controlled to match a set-point of the low-level controller. For example, such a low-level controller may control the current to a heater of the first vessel such that the temperature inside the vessel matches the set-point, or it may control the current to a motor that stirs the mixture such that the motor rotates at a certain speed.

The plant also has a plurality of sensors. Each such sensor measures at least one process variable of one of the physical process, and/or of the plant as a whole. For example, there may be a sensor measuring the temperature in a vessel, and/or a sensor for the turbidity of a mixture inside the vessel that is a measure of how homogeneous the mixture is. Two examples of sensors that measure a process variable of the plant as a whole are: a sensor that measures the mass flow of final product from the plant, and a sensor that measures the total electrical current drawn by the plant. That is, process variables may comprise state variables of the physical process, and/or of the plant as a whole, but may more generally also comprise any other measured quantities that are relevant to the physical process, and/or to the plant as a whole.

The model takes current set-points of low-level controllers and current values of the process variables measured by the sensors as inputs. Based on this, the model outputs predicted future values of the process variables that are likely to result from applying the set-points to the low-level controllers at the present time.

For example, the model may predict that when starting from a certain mass flow of final product and a set-point temperature of 40° C. inside a vessel, an increase of this temperature to 45° C. will cause a chemical reaction inside the vessel to speed up, so that the flow of final product will increase by 15%.

In the course of the method, a division of a representation of the plant into sub-units is obtained. The term "representation" means that the division does not physically cut through the actual constituents of the plants and their interconnections, but is rather performed on an engineering model of the plant. In other words, the representation can be regarded as a "digital twin" of the plant.

The division may be obtained from any source. If the plant is a modular industrial plant, then the already existing division into the physical process modules that make up the plant may be used.

For example, a pharmaceutical company may be in a need to frequently reconfigure the plant for the manufacturing of a new product because these products are so concentrated in terms of end effect per unit mass or volume that a year's supply may be produced in only a few weeks' time. The company may own a certain fleet of physical process modules and arrange respective subsets from this fleet in respective configurations to, for example, first manufacture product A, then product B, then product C and finally move back to product A again. In each configuration, the physical process modules are linked together in a temporary manner for the time during which this configuration shall be used.

If no division into physical process modules exists, the layout of the plant may be actively searched for suitable sub-units. In other words, the representation of the plant may be actively divided into sub-units. Several strategies for doing this, which may be used individually or in arbitrary combinations, are detailed below. But even in the case a division into physical process modules exists, this need not be the final division that is obtained. For example, there may be cases where two or more physical process modules may be combined into one sub-unit.

The input-output behavior of each sub-unit is characterized by respective subsets of the set-points, the current values of the process variables and the future values of the process variables as well as the set-points needed to achieve them. In the toy example presented above, the first sub-unit may be the first vessel in which the mixture is heated and stirred, and the second sub-unit may be the second vessel in which the mixture is polymerized.

For each sub-unit, a dynamic sub-model is obtained, with the inputs of this sub-model comprising the subset of set-points and the subset of current values of process variables, and the outputs of the sub-model comprising future values of the process variables. Sticking to the toy example, the first sub-model may model how the mass flow of mixture leaving the first vessel, and the homogeneity of the mixture, will be influenced by changes to the set-points for the temperature and for the motor speed. The second sub-model may model how the mass flow of final product leaving the second vessel, and some measure of the quality of the polymerization, will be influenced by changes to the set-points for the mass flow of the third component being added in the second vessel and for the intensity of the UV light.

Sub-models may be obtained from any suitable source. For example, if an abstract Module Type Package, MTP, is associated with a physical process module, this package may already contain a sub-model corresponding to the physical process module. If a sub-unit in the division corresponds to this physical process module, then the sub-model from the MTP may be immediately used. But sub-models may also be obtained from a library or catalogue that associates certain sub-units to sub-models. Specifically, a strategy to obtain the division of the representation of the plant may be to cover as much as possible of the plant layout with sub-units for which corresponding sub-models are available.

From the engineering layout of the plant, and/or from an existing composition of the plant from physical process modules, the dependencies between the sub-units are obtained. In the toy example, the mass flow of the mixture of the first and second substances that enters the second vessel is equal to the mass flow of this mixture leaving the first vessel if there is no other source from which this mixture can come. The sub-models are combined into the model of the plant according to these dependencies. If several physical process modules are connected to each other, the mutual dependencies between these physical process modules are set by the physical interconnections (e.g., by means of pipes, cables or hoses) between these physical process modules.

The inventors have found that this method for generating the dynamic model needed for the model predictive control of the overall plant makes the creation of the model much more efficient and much more transparent for the engineer. Previously, when a monolithic model was created for the plant as a whole, this was more of an art than it was of a task for an automation engineer. A process expert had to decide manually whether to use theoretical modelling based on physical laws and simplifying assumptions, experimental modelling, or a mixture of the two. The creation of the model required many iterations and tests and was very difficult to automate. The model was frequently so highly specialized for the purpose of model prediction control that regular plant engineers could not explain the reasoning behind the model. Therefore, when it was actually used on the plant, it frequently generated set-points that were not explainable for the regular operator.

By contrast, the present method provides a straightforward approach based on building blocks (i.e., sub-models) that are transparent to the regular plant operator. Therefore, the set-points that are generated by the model make more sense to the regular operator. The regular operator therefore has a chance to oversee the overall automated control of the plant and notice if there is anything unusual. This provides an additional layer of safety in case of any unexpected malfunctions, such as a faulty sensor or a clogged pipe.

Moreover, the model may be much more easily adapted to any changes in the plant. For example, the trend is going from monolithic plants to modular plants where modules may be added and removed, or brought on-line and off-line, as needed. Whenever a change of this type happens, the overall model for the plant may be adapted in a straight-forward manner by simply adding and removing identical copies of one and the same sub-model in the right place. Sticking to the toy example, there may be two identical copies of the first vessel. If there is a high demand for the final product, then both copies may be used in order to produce enough feedstock for the second vessel in which the polymerization is to be performed. If there is a low demand and the use of one copy of the first vessel is sufficient, then the other copy may be taken off-line in order to save electricity for the heating and for the stirring.

Also, should any physical changes be made within one sub-unit, only the one sub-model of this sub-unit needs to be changed. In the toy example, the second vessel may need to be exchanged for a new one that has a different geometry, so the local distribution of the UV light intensity, and hence the polymerization, inside the second vessel will be different. This will affect the relationship between the set-point for the intensity of the UV lamp on the one hand and the mass flow and quality of the final product on the other hand.

The assembly of the sub-models to the final model for the whole plant is a process that may be easily automated, or at least aided by the use of a computer. Even if the task of creating individual sub-models for the sub-units is left to a human expert, the overall savings in human effort are still substantial because it is much easier to produce a plurality of rather simple sub-models than it is to produce a much more complex monolithic model. This is especially true if one particular human expert is to be taken as a given. If the monolithic model is too complex for this particular expert, then the expert will never be able to produce it. But if the task can be broken down to creating several simple sub-models, each of which is within reach of the expert, the expert can produce the sub-models one by one.

Furthermore, the present method also makes it practical to refine individual sub-models later on after the initial creation of the model for the plant as a whole. For example, the plant may be initially started up with a rather simple sub-model in a particular place to get going quickly. Further work by the plant operator may then lead to a new refined sub-model that can simply be snapped in the place of the previous simple model. Since the sub-model will always be the same for all instances of a sub-unit in a plant, there is also a market for improved sub-models. For example, if a sub-unit coincides with a unit that is marketed as one package (e.g., the first vessel with the heater and the stirrer already built-in), then the manufacturer of this package, or even a third party, may release a more refined model later on.

The described advantages do not come "for free". Computation of a prediction according to a model generated according to the present method involves sub-computations according to many sub-models, and the results of these sub-computations need to be aggregated. This may take longer than computation of a prediction according to a specially crafted, highly sophisticated monolithic model. However, this is a small price to pay, and it can be paid in a straight-forward manner by adding more computing resources. By contrast, if an industrial process is too complex to understand for a human modelling expert, then there will be no model and no model predictive control of this process at all.

In a particularly advantageous embodiment, at least one sub-unit is chosen to correspond to a module of a modular enabled automation solution that is in place at the plant. When changes are made to the layout of such plants, they are likely to be additions and removals of modules. Therefore, if sub-models are available for each such module, the overall dynamic model of the plant may be easily re-created in response to such a change by just "re-compiling" the assembly of the sub-models according to the then-current layout of the plant.

Specifically, in a further specially advantageous embodiment, the module may provide a dynamic model of its own, and this may be immediately used as the sub-model for the corresponding sub-unit. For example, the module may have a Module Type Package, MTP, as its "digital twin". The MTP may contain a dynamic model of the sub-unit that corresponds to the module, and/or information regarding the inputs and outputs of this sub-unit, and/or information about the operation, interfaces, simulation, automation and parameters of the sub-unit. The MTP provides an abstraction that greatly facilitates the combination of modules from different vendors into one plant, including the generating of a dynamic model for this plant as a whole.

However, exploiting an existing sub-division of the plant into modules is not the only way by which the generating of the overall model may be automated. There are other ways to at least partially generate the model with the aid of a computer.

One such way is to search the plant layout for sub-units of which there are multiple occurrences in the plant, wherein each such sub-unit comprises at least two low-level controllers and at least two sensors. Since the sub-model for each instance of the sub-unit will be the same, the sub-model will have to be created only once, and it can then be re-used for all other instances.

In an exemplary embodiment, this search may be focused on sub-units of a specific size, and if no, or no more, sub-units of this size are found, the searching maybe continued with a reduced size. This provides a straight-forward way to detect repeating units in the plant layout even without knowing the constituents of these units.

Another possible strategy for dividing the representation of the plant is to make the size of the sub-units dependent on the requirement for accuracy of the corresponding sub-models. If a lesser accuracy is needed, then a relatively large sub-unit may be abstracted by means of a rather simple sub-model. Therefore, in a further specially advantageous embodiment, in response to determining that there is a lesser requirement for the accuracy of the sub-model of a second sub-unit than there is for the accuracy of the sub-model of a first sub-unit, the second sub-unit is chosen to be larger than the first sub-unit.

In a further advantageous embodiment, at least one boundary of a sub-unit is chosen to coincide with a boundary between different areas of responsibility within a plant. In this manner, the obtaining of sub-models is facilitated because there are less people who need to be asked for pertinent information when crafting the sub-model.

The overall dynamic model of the plant is not required to be generated on-site on the plant itself. Rather, it may also be generated by an entity that is different from the owner or operator of the plant. For example, the automated generation of models for industrial plants based on computerized representations of the plant layout may be provided as a service. The finished model is thus a saleable product that has a value of its own. The invention therefore also relates to a time-discrete dynamic model for an industrial plant that has been produced by the method as described above.

A finished model generated by the method as described above has a different internal structure than a monolithic model. The assembling of the model from sub-modules leaves a characteristic "fingerprint" on the model that may be revealed upon examination of the model. Therefore, the invention also relates to a dynamic predictive model for an industrial plant that comprises a plurality of sub-models, wherein the inputs of the model are distributed across the inputs of the sub-models, the outputs of the model are compiled from the outputs of the sub-models, and at least one output of one sub-model is processed into at least one input of one other sub-model.

By means of the model, the invention also provides a method for operating an industrial plant that comprises a plurality of physical processes that are dependent in the sense that the outcome of at least one first process is fed into at least one second process, a plurality of low-level controllers, each such controller acting upon at least one physical process such that at least one process variable of this process is controlled to match a set-point of the low-level controller, and a plurality of sensors, each sensor measuring at least one process variable of one of the physical processes, and/or of the plant as a whole.

In the course of this method, using the dynamic model as described above, for a plurality of candidate sets of set-points for the low-level controllers, sets of future values of process variables of the plant are predicted. From the plurality of candidate sets, the candidate set for which the corresponding predicted set of future values of process variables is optimal according to at least one predetermined optimality criterion is determined as an optimal set of set-points.

There is complete freedom as to the optimality criteria. Exemplary criteria that are relevant in industrial processes are: a minimal energy consumption, a minimal material usage, a maximal throughput, a minimal amount of waste, and/or a minimal total cost for producing a given quantity of a final product; a minimal level of noise or other pollutant emitted from the plant; a minimal amount of wear of the plant; or a minimal downtime of the plant.

The optimal set of set-points is applied to the low-level controllers. At least one of these low-level controllers applies at least one actuating output to at least one physical actor. The physical actor in turn physically changes at least one aspect of the behavior of at least one physical process contained within the overall industrial process.

In a further specially advantageous embodiment, the determining of the optimal set of set-points is bounded by at least one constraint regarding at least one set-point, at least one process variable, or any combination thereof. The possibility to explicitly model constraints is one of the key advantages of model predictive control.

As described above, the methods may be wholly or partially computer-implemented. Specifically, they may be implemented in a software that, when executed by one or more computers and/or a control system, brings about the advantages described above. The invention therefore also relates to a computer program, comprising machine-readable instructions that, when executed on one or more computers and/or a control system, causes the computer, and/or the control system, to perform one or both of the methods as described above.

The invention also relates to a non-transitory machine-readable storage medium and/or a download product with the computer program as described above, and/or with the dynamic model as described above. Sub-models stored within Module Type Packages corresponding to physical process modules may be called upon as sub-routines by this dynamic model, thereby incorporating these sub-models into the dynamic model.

The invention also relates to one or more computers and/or a control system with the dynamic model as described above, with the computer program as described above, with the storage medium or download product as described above, and/or specifically adapted in any other way for performing one or both of the methods as described above. Such specific adaptation may, for example, comprise an at least partial implementation of the method in application specific integrated circuits, ASICs.

FIG. 1 shows an exemplary embodiment of the method 100. In step 110, a representation of the plant 1 is divided into sub-units 1a and 1b. This also means that process variables 41-49 are divided into respective sets 4a, 4b belonging to sub-units 1a and 1b, future values 41'-49' of process variables 41-49 are divided into respective sets 4a', 4b' belonging to sub-units 1a and 1b, and set-points 51-57 for low-level controllers 31-37 are divided into respective sets 5a, 5b belonging to sub-units 1a and 1b.

Some examples of how the dividing 110 may be performed are shown within the box 110.

According to block 111, at least one module of a modular enabled automation solution may be chosen as a sub-unit 1a, 1b.

According to block 112, a search for sub-units 1a, 1b that occur in multiple instances within the plant 1 may be performed. According to sub-block 113, this search may be focused on sub-units 1a, 1b of a specific size. According to sub-block 114, the search may then move on to a reduced size.

According to block 115, it may be determined that for a second sub-unit 1b, the corresponding sub-model 13b is under a less stringent accuracy requirement than the sub-model 13a corresponding to a first sub-unit 1a. In response to this determination, according to block 116, the second sub-unit 1b may be made larger than the first sub-unit 1a.

According to block 117, at least one boundary of a sub-unit 1a, 1b may be chosen to coincide with a boundary between different areas of responsibility in the plant 1.

In step 120, dynamic sub-models 13a, 13b may be generated for the sub-units 1a, 1b. Two exemplary ways of doing this are shown within box 120.

According to block 121, a dynamic model provided by a module that is chosen as a sub-unit 1a, 1b may be directly used as the sub-model 13a, 13b for that sub-unit 1a, 1b.

According to block 122, information regarding the model, as well as other meta-information, may be obtained from a Module Type Package, MTP, that is a digital twin of the sub-unit 1a, 1b.

In step 130, dependencies 14 between sub-units 1a, 1b are obtained from the layout of the plant 1, and/or from an existing composition of the plant from physical process modules.

In step 140, the sub-models 13a, 13b are combined into the model 10 of the plant 1 according to the dependencies 14.

Figure 2:
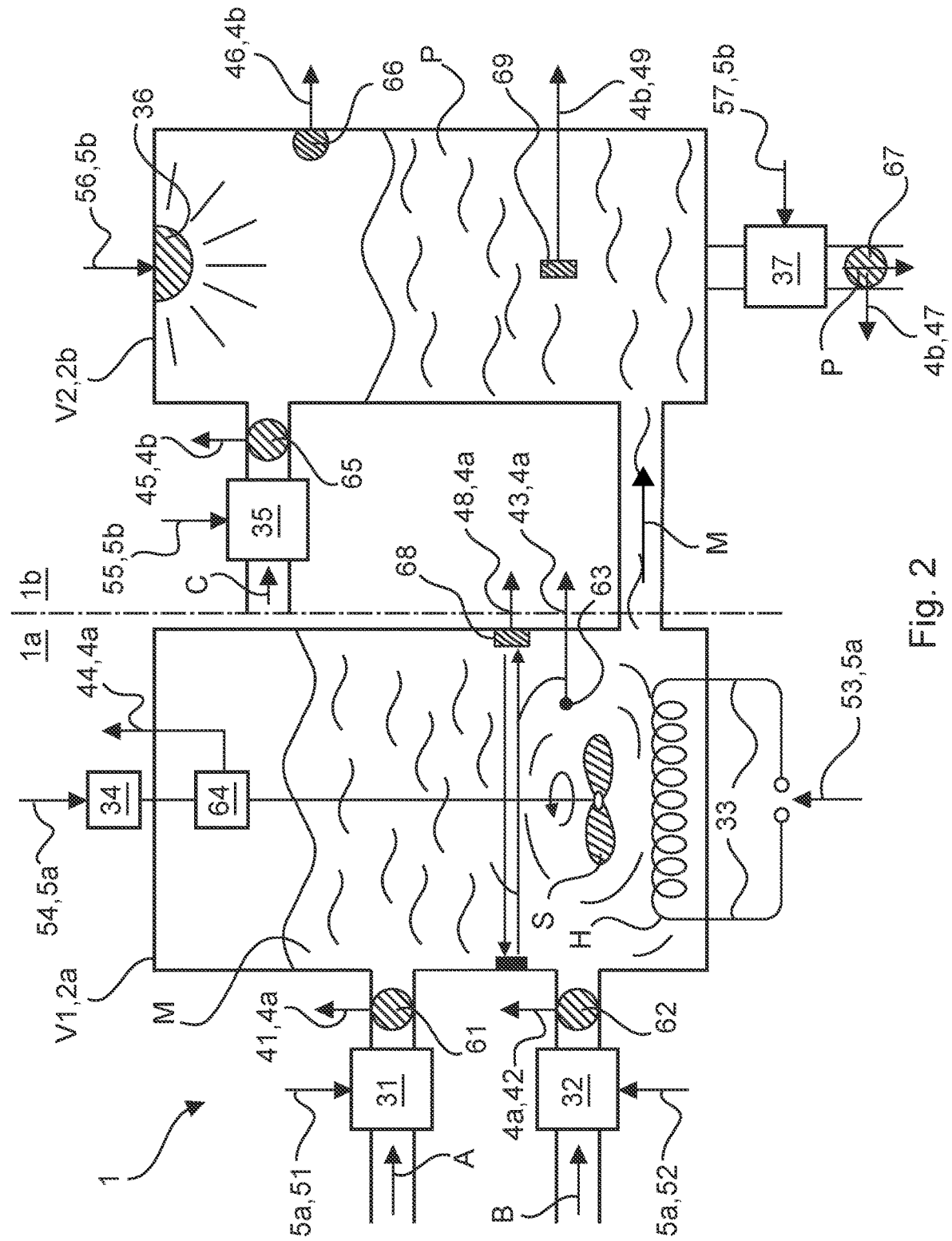
FIG. 2: Toy example of a plant 1 for illustrating the method 100.

FIG. 2 shows a toy example of a plant 1 to which the method 100 may be applied. For reasons of legibility, throughout FIG. 2, low-level controllers 31-37 are not shown separately from the actors on which they act. Rather, the actors are drawn and annotated with the reference numerals 31-37 of the corresponding low-level controllers.

The plant 1 comprises a first vessel V1 and a second vessel V2.

In first vessel V1, in a physical process 2a, two substances A and B are stirred and heated to produce a mixture M. To this end, a controller 31 controls the mass flow 41 of substance A, which is measured by sensor 61, to match a set-point 51;

a controller 32 controls the mass flow 42 of substance B, which is measured by sensor 62, to match a set-point 52;

a controller 33 controls the temperature 43 inside first vessel V1, which is measured by sensor 63, by means of a heater H to match a set-point 53;

a controller 34 controls the rotating speed 44 of a stirrer S, which is measured by sensor 64, to match a set-point 54.

In addition, a sensor 68 measures the turbidity 48 of mixture M inside first vessel V1.

The mixture M passes to second vessel V2, where, in a second physical process 2b, it is further augmented with a third substance C and UV-polymerized to form a product P. To this end, a controller 35 controls the mass flow 45 of substance C, which is measured by a sensor 65, to match a set-point 55;

a controller 36 controls the intensity 46 of UV radiation, which is measured by sensor 66, to match a set-point 56; and a controller 37 controls the mass flow 47 of final product P, which is measured by sensor 67, to match a set-point 57.

In addition, a sensor 69 measures the viscosity 49 of product P, which is a measure of how good the polymerization is.

In this toy example, the dividing of the representation of the plant 1 into sub-units 1a, 1b is easy: What is measured in, or acts upon, first vessel V1 is assigned to sub-unit 1a. What is measured in, or acts upon, second vessel V2 is assigned sub-unit 1b. Process variables 41-49 are assigned to subsets 4a and 4b, and set-points 51-57 are assigned to subsets 5a and 5b, accordingly.

Figure 3:
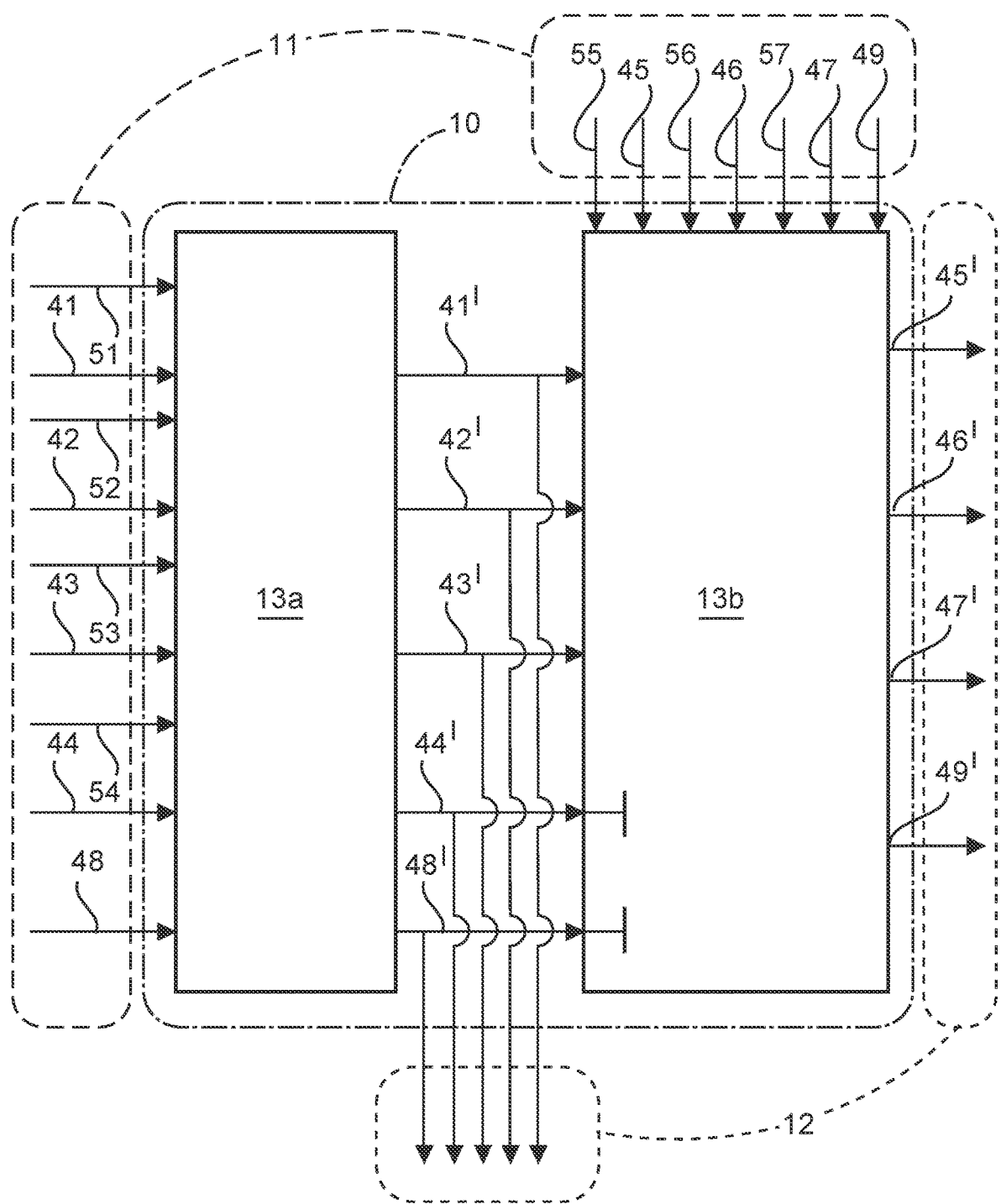
FIG. 3: Exemplary model 10 generated for the plant 1 shown in FIG. 1 using the method 100.

FIG. 3 illustrates the model 10 generated in this manner. The model 10 consists of two sub-modules 13a and 13b that correspond to sub-units 1a and 1b. The first sub-module 13a gets the current values of process variables 41-44 and 48, as well as the set-points 51-54, that pertain to vessel V1 as inputs. Based on these inputs, the sub-model 13a predicts how the process variables 41-44 and 48 will evolve to future values 41'-44' and 48'.

These future values 41'-44' and 48' of process variables 41-44 and 48 are fed as inputs into second sub-model 13b. Furthermore, the second sub-model 13b gets the current values of process variables 45-47 and 49, as well as the set points 55-57, that pertain to vessel V2 as inputs. In the example shown in FIG. 3, second sub-model 13b takes no further action on the future rotating speed 44' of the stirrer S and on the future turbidity 48' of mixture M because these quantities do not directly influence the result of the polymerization. But the sum of the future mass flows 41' and 42' of substances A and B is the mass flow of mixture M, which is relevant for the stoichiometry of product P. Also, the polymerization in vessel V2 is temperature-dependent, so the future temperature 43 of mixture M in vessel V1 is relevant for second sub-model 13b as well.

Second sub-model 13b predicts future values 45'-47' and 49' for process variables 45-47 and 49 based on their current values, the set-points 55-57 that directly act upon them, and the future values 41'-43' of relevant process variables 41-43, as obtained from first sub-model 13a.

In the example illustrated in FIG. 3, only future values 41'-44' and 48' from first sub-model 13a are fed into second sub-model 13b, but not vice versa. However, in real applications, one or more of the future values 45'-47' and 49' from second sub-model 13b may also be relevant to first sub-model 13a.

In total, all current values of process variables 41-49 and all set-points 51-57 for the low-level controllers 31-37 form the inputs 11 of the new model 10 for the plant 1, whereas all future values 41'-49' of process variables 41-49 form the outputs 12 of the new model 10.

Figure 4:
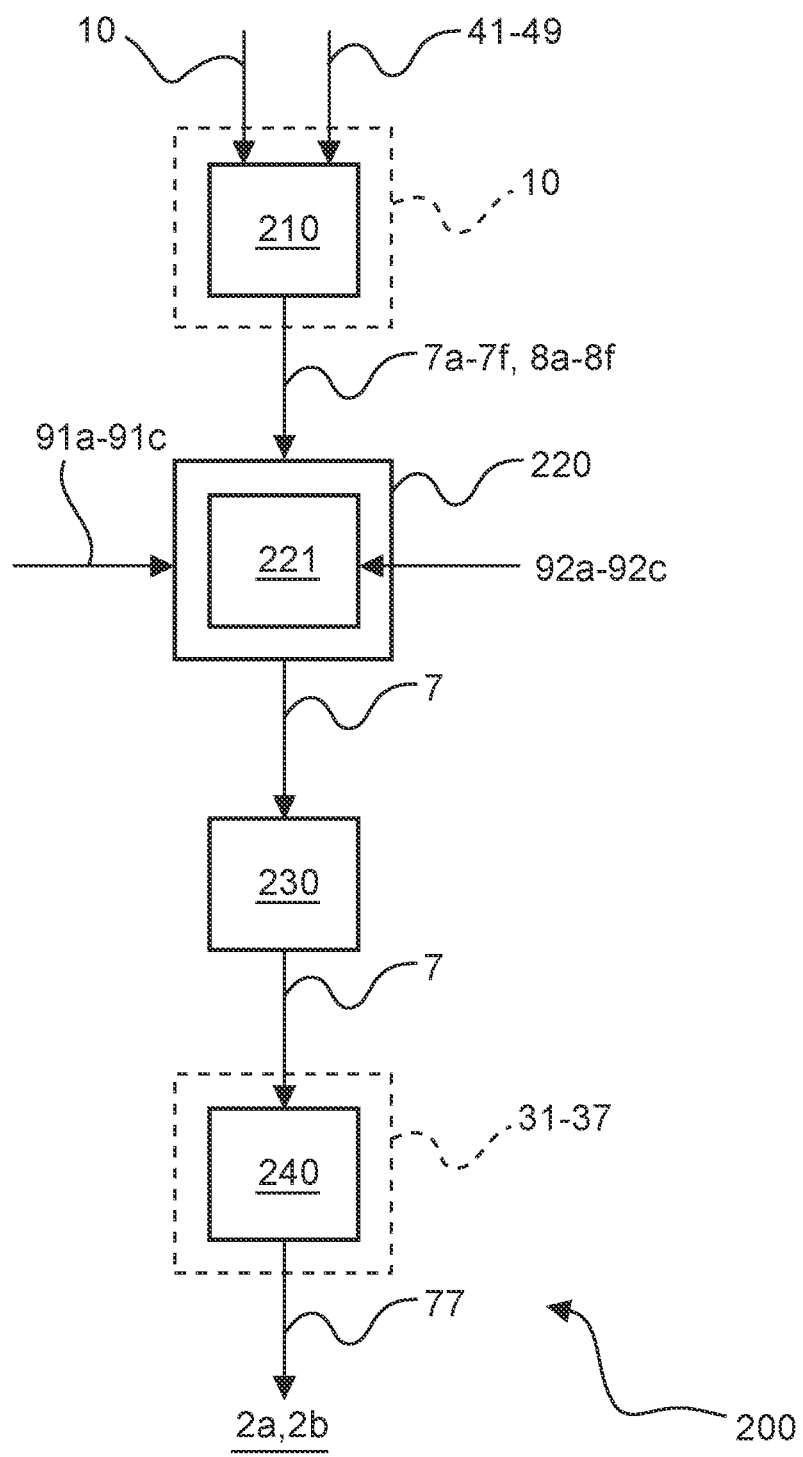
FIG. 4: Exemplary embodiment of the method 200.

FIG. 4 shows an exemplary embodiment of the method 200 for operating the plant 1. In step 210, the dynamic model 10 is used to predict, based on current values of the process variables 41-49, sets 8a-8f of future values 41'-49' of these process variables 41-49 that will result when different candidate sets 7a-7f of set points 51-57 are applied to low-level controllers 31-37.

In step 220, the candidate set 7a-7f of set points 51-57 for which the corresponding set 8a-8f of future values 41'-49' is optimal according to optimality criteria 91a-91c is determined to be the optimal set 7 of set-points 51-57. According to block 221, this optimization may be constrained according to constraints 92a-92c.

The optimal set 7 of set-points 51-57 is applied to the low-level controllers 31-37 in step 230. In step 240, the low-level controllers 31-37 apply actuating outputs 77 to physical actors that physically change aspects of the behavior of the physical processes 2a, 2b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 industrial plant
1a, 1b sub-units within plant 1
2a, 2b physical processes in plant 1
10 dynamic model of plant 1
11 inputs of model 10
12 outputs of model 10
13a, 13b sub-models within model 10
14 dependencies between sub-units 1a, 1b
31 low-level controller for mass flow 41
32 low-level controller for mass flow 42
33 low-level controller for temperature 43
34 low-level controller for rotating speed 44
35 low-level controller for mass flow 45
36 low-level controller for UV intensity 46
37 low-level controller for mass flow 47
4a, 4b subsets of current values of process variables 41-49
4a', 4b' subsets of future predicted values 41'-49' of process variables 41-49
41 mass flow of substance A
42 mass flow of substance B
43 temperature in vessel V1
44 rotating speed of stirrer S
45 mass flow of substance C
46 UV intensity
47 mass flow of product P
48 turbidity of mixture M in vessel V1
49 viscosity of product P in vessel V2
41'-49' future predicted values of process variables 41-49
5a, 5b subsets of set-points 51-57
51 set-point for mass flow 41
52 set-point for mass flow 42
53 set-point for temperature 43
54 set-point for rotating speed 44
55 set-point for mass flow 45
56 set-point for UV intensity 46
57 set-point for mass flow 47
61 sensor for mass flow 41
62 sensor for mass flow 42
63 sensor for temperature 43
64 sensor for rotating speed 44
65 sensor for mass flow 45
66 sensor for UV intensity 46
67 sensor for mass flow 47
68 sensor for turbidity 48
69 sensor for viscosity 49
7 optimal set of set-points 51-57
77 actuating output based on optimal set 7 of set-points 51-57
7a-7f candidate sets of set-points 51-57
8a-8f sets of future predicted values 41'-49' obtained for candidate sets 7a-7f
100 method for generating model 10
110 dividing representation of plant 1 into sub-units 1a, 1b
111 choosing module as sub-unit 1a, 1b
112 searching for recurring sub-units 1a, 1b
113 focusing search 112 on specific size of sub-unit 1a, 1b
114 continuing search 112 with reduced size of sub-unit 1a, 1b
115 determining accuracy requirements for sub-models 13a, 13b
116 choosing sizes of sub-units 1a, 1b according to accuracy requirements
117 choosing boundary according to areas of responsibility
120 obtaining sub-models 13a, 13b for sub-units 1a, 1b
121 choosing module-provided sub-model 13a, 13b
122 reading information from Module Type Package, MTP
130 determining dependencies between sub-units 1a, 1b
140 combining sub-models 13a, 13b according to dependencies 14
200 method for controlling plant 1
210 predicting sets 8a-8f of future values 41'-49' for candidate sets 7a-7f
220 determining optimal set 7 with optimality criteria 91a-91c
221 applying constraints 92a-92c to determining 220
230 applying optimal set 7 to low-level controllers 31-37
240 applying actuating outputs 77 on physical process 2a, 2b
A, B, C substances
H heater
M mixture
P product
S stirrer
V1, V2 vessels

What is claimed is:

1. A method for generating a dynamic model of an industrial plant having: a plurality of physical processes that are dependent such that an outcome of at least one first process is fed into at least one second process; a plurality of low-level controllers, each controller acting upon at least one physical process such that at least one process variable of the at least one physical process is controlled to match a set-point of the low-level controller; and a plurality of sensors, each sensor being configured to measure at least one process variable of one of the physical processes, and/or of the plant as a whole, the set-points of the low-level controllers and current values of the process variables measured by the sensors being the inputs of the model, and predicted future values of the process variables that are likely to result from applying the set-points to the low-level controllers being the outputs of the model, the method comprising:

obtaining a division of a representation of the plant into a plurality of sub-units corresponding to one or more physical process modules of a modular enabled automation solution at the industrial plant, an input-output behavior of each sub-unit being characterized by respective subsets of the set-points, subsets of the current values of process variables, and subsets of the future predicted values of process variables;

obtaining a dynamic sub-model for each sub-unit based on a digital representation of the respective one or more physical process modules of the obtained sub-unit, inputs of the sub-model comprising the subset of set-points and the subset of current values of process variables, and outputs of the sub-model comprising the subset of future predicted values of process variables;

obtaining, from a layout of the plant, and/or from an existing composition of the plant from physical process modules, dependencies between the sub-units; and combining the sub-models into the model of the plant according to the dependencies for the manufacture of a given product, wherein the physical process modules of the model are linked together based on a temporary linking for the time during which a configuration of the plant for a process that manufactures the given product shall be used and until the sub-models are recombined for a configuration of the plant that is adapted to a further process that manufactures a further product.

2. The method of claim 1, wherein a dynamic model provided by the module is chosen as the sub-model for the at least one sub-unit.

3. The method of claim 1, further comprising:
obtaining information regarding the inputs and outputs of the sub-unit, and/or regarding a dynamic model of the sub-unit, and/or further information about the operation, interfaces, simulation, automation, and parameters of the sub-unit from a Module Type Package (MTP) corresponding to the sub-unit.

4. The method of claim 1, wherein the obtaining the division into sub-units comprises searching for sub-units of which there are multiple occurrences in the plant, and
wherein each such sub-unit comprises at least two low-level controllers and at least two sensors.

5. The method of claim 4, wherein the searching is focused on sub-units of a specific size, and if no, or no more, sub-units of the specific size are found, the searching is continued with a reduced size.

6. The method of claim 1, wherein, in response to determining that there is a lesser requirement for an accuracy of the sub-model of a second sub-unit than there is for an accuracy of the sub-model of a first sub-unit, the second sub-unit is chosen to be larger than the first sub-unit.

7. The method of claim 1, wherein at least one boundary of a sub-unit is chosen to coincide with a boundary between different areas of responsibility in the plant.

8. The method of claim 1, wherein the dynamic model of the industrial plant comprises a first dynamic model for producing the given product, the method further comprising:
combining a subset of sub-models of the plurality of sub-models, according to the dependencies, into a second dynamic model of the industrial plant for producing the further product,
wherein the second dynamic model is an alternative to the first dynamic model.

9. A non-transitory computer-readable medium having processor-executable instructions stored thereon, wherein the processor-executable instructions, when executed by one or more processors, facilitate performance of the method of claim 1.

10. A method for generating a dynamic model of an industrial plant having: a plurality of physical processes that are dependent such that an outcome of at least one first process is fed into at least one second process; a plurality of low-level controllers, each controller acting upon at least one physical process such that at least one process variable of the at least one physical process is controlled to match a set-point of the low-level controller; and a plurality of sensors, each sensor being configured to measure at least one process variable of one of the physical processes, and/or of the plant as a whole, the set-points of the low-level controllers and current values of the process variables measured by the sensors being the inputs of the model, and predicted future values of the process variables that are likely to result from applying the set-points to the low-level controllers being the outputs of the model, the method comprising:

obtaining a division of a representation of the plant into a plurality of sub-units corresponding to one or more physical process modules of a modular enabled automation solution at the industrial plant, an input-output behavior of each sub-unit being characterized by respective subsets of the set-points, subsets of the current values of process variables, and subsets of the future predicted values of process variables, wherein the division is obtained from a Module Type Package (MTP) that is a digital twin of the physical process module that contains a dynamic model of the respective sub-unit that corresponds to the module, information regarding the inputs and outputs of this sub-unit, and/or information about the operation, interfaces, simulation, automation and/or parameters of the respective sub-unit;

obtaining a dynamic sub-model for each sub-unit based on a digital representation of the respective one or more physical process modules of the obtained sub-unit, inputs of the sub-model comprising the subset of set-points and the subset of current values of process variables, and outputs of the sub-model comprising the subset of future predicted values of process variables;

obtaining, from a layout of the plant, and/or from an existing composition of the plant from physical process modules, dependencies between the sub-units; and combining the sub-models into the model of the physical process modules of the plant according to the dependencies for the manufacture of a given product.

11. The method of claim 10, wherein the obtaining the division into sub-units comprises searching for sub-units of which there are multiple occurrences in the plant, and
wherein each such sub-unit comprises at least two low-level controllers and at least two sensors.

12. The method of claim 11, wherein the searching is focused on sub-units of a specific size, and if no, or no more, sub-units of the specific size are found, the searching is continued with a reduced size.

13. The method of claim 10, wherein, in response to determining that there is a lesser requirement for an accuracy of the sub-model of a second sub-unit than there is for an accuracy of the sub-model of a first sub-unit, the second sub-unit is chosen to be larger than the first sub-unit.

14. The method of claim 10, wherein at least one boundary of a sub-unit is chosen to coincide with a boundary between different areas of responsibility in the plant.

15. The method of claim 10, wherein the dynamic model of the industrial plant comprises a first dynamic model for producing the given product, the method further comprising:
combining a subset of sub-models of the plurality of sub-models, according to the dependencies, into a second dynamic model of the industrial plant for producing the further product,
wherein the second dynamic model is an alternative to the first dynamic model.

* * * * *